(12) United States Patent
McCaffrey

(10) Patent No.: US 11,549,373 B2
(45) Date of Patent: Jan. 10, 2023

(54) REDUCED DEFLECTION TURBINE ROTOR

(71) Applicant: RAYTHEON TECHNOLOGIES CORPORATION, Farmington, CT (US)

(72) Inventor: Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 76 days.

(21) Appl. No.: 17/123,344

(22) Filed: Dec. 16, 2020

(65) Prior Publication Data

US 2022/0186619 A1 Jun. 16, 2022

(51) Int. Cl.
*F01D 5/02* (2006.01)
*F01D 5/06* (2006.01)
(Continued)

(52) U.S. Cl.
CPC ............. *F01D 5/025* (2013.01); *F01D 5/066* (2013.01); *F01D 25/16* (2013.01); *F01D 11/122* (2013.01);
(Continued)

(58) Field of Classification Search
CPC .......... F01D 5/025; F01D 5/066; F01D 11/22; F01D 25/16; F01D 25/28; F05D 2240/24;
(Continued)

(56) References Cited

U.S. PATENT DOCUMENTS

| 4,798,547 A | 1/1989 | Gearhart |
| 4,827,712 A | 5/1989 | Coplin |

(Continued)

FOREIGN PATENT DOCUMENTS

| JP | 53143817 | 12/1978 |
| JP | 07217499 | 8/1995 |
| WO | 2014055113 | 4/2014 |

OTHER PUBLICATIONS

Kandebo, S. (1998). Geared-turbofan engine design targets cost, complexity. Aviation Week & Space Technology. Feb. 23, 1998. pp. 34-35.
International Search Report for International Application No. PCT/US2013/025276 dated Nov. 7, 2013.
(Continued)

*Primary Examiner* — Loren C Edwards
(74) *Attorney, Agent, or Firm* — Carlson, Gaskey & Olds, P.C.

(57) ABSTRACT

A turbine section for a gas turbine engine according to an example of the present disclosure includes, among other things, a first turbine rotor coupled to a first turbine shaft. The first turbine shaft is rotatable about a longitudinal axis. A second turbine rotor is coupled to a second turbine shaft. The second turbine shaft is rotatable about the longitudinal axis, and the second turbine rotor is axially aft of the first turbine rotor relative to the longitudinal axis. An aft bearing assembly rotatably supports the second turbine shaft. The second turbine rotor includes a disk assembly that carries at least one row of turbine blades. The disk assembly is mechanically attached to the second turbine shaft at an attachment point. The attachment point is axially aft of the aft bearing assembly such that an aft portion of the second turbine shaft is cantilevered from the aft bearing system with respect to the longitudinal axis. The disk assembly includes a metallic material. Each of the turbine blades comprises a ceramic matrix composite (CMC) material.

16 Claims, 5 Drawing Sheets

(51) Int. Cl.
*F01D 25/16* (2006.01)
*F01D 11/12* (2006.01)

(52) U.S. Cl.
CPC .... *F05D 2240/24* (2013.01); *F05D 2240/307* (2013.01); *F05D 2240/50* (2013.01); *F05D 2260/30* (2013.01)

(58) Field of Classification Search
CPC ........... F05D 2240/307; F05D 2240/50; F05D 2260/30; F02C 7/06; F02C 7/36; F02C 3/107
See application file for complete search history.

(56) References Cited

U.S. PATENT DOCUMENTS

| | | | |
|---|---|---|---|
| 4,982,914 A | 1/1991 | Eickmann | |
| 5,344,280 A | 9/1994 | Langenbrunner et al. | |
| 5,591,057 A | 1/1997 | Dai et al. | |
| 5,860,275 A | 1/1999 | Newton et al. | |
| 6,039,542 A | 3/2000 | Schilling et al. | |
| 7,364,402 B2 | 4/2008 | Brault et al. | |
| 7,374,403 B2 | 5/2008 | Decker et al. | |
| 7,828,521 B2 | 11/2010 | Bart | |
| 7,972,109 B2 | 7/2011 | Crall et al. | |
| 8,246,292 B1 | 8/2012 | Morin et al. | |
| 8,596,036 B2 | 12/2013 | Hyde et al. | |
| 8,720,205 B2 | 5/2014 | Lugg | |
| 8,857,191 B2 | 10/2014 | Hyde | |
| 8,887,487 B2 | 11/2014 | Kupratis et al. | |
| 10,161,773 B2 | 12/2018 | Degaribody | |
| 10,358,924 B2 | 7/2019 | Gallagher et al. | |
| 10,371,047 B2 | 8/2019 | Schwarz | |
| 10,371,061 B2 | 8/2019 | Adams et al. | |
| 10,724,380 B2 | 7/2020 | Groves, II et al. | |
| 10,794,188 B2 | 10/2020 | Gaebler et al. | |
| 2003/0163983 A1* | 9/2003 | Seda | F02K 3/072 60/39.162 |
| 2008/0184694 A1 | 8/2008 | Guimbard et al. | |
| 2009/0269197 A1 | 10/2009 | Evans | |
| 2012/0023899 A1 | 2/2012 | Yasuda | |
| 2012/0195766 A1 | 8/2012 | Cohin et al. | |
| 2012/0198815 A1 | 8/2012 | Suciu et al. | |
| 2015/0322806 A1* | 11/2015 | Twelves, Jr. | F01D 5/3084 403/30 |
| 2016/0333786 A1 | 11/2016 | Glynn et al. | |
| 2017/0190446 A1 | 7/2017 | Williams | |
| 2018/0003112 A1* | 1/2018 | Kupratis | F02C 3/107 |

OTHER PUBLICATIONS

Gray, D.E. (1978). Energy efficient engine preliminary design and integration studies. Prepared for NASA. NASA CR-135396. Nov. 1978. pp. 1-366.
Supplementary European Search Report for Application No. 13845886.4 dated Sep. 25, 2015.
International Preliminary Report on Patentability for International Application No. PCT/US2013/025276 dated Apr. 16, 2015.
Haldenbrand, R. and Norgren, W.M. (1979). Airesearch QCGAT program [quiet clean general aviation turbofan engines]. NASA-CR-159758. pp. 1-199.
Edkins, D.P., Hirschkron, R., and Lee, R. (1972) TF34 turbofan quiet engine study. Final Report prepared for NASA. NASA-CR-120914. Jan. 1, 1972. pp. 1-99.
Nillis, W.S. (1979). Quiet clean short-haul experimental engine (QCSEE) final report. NASA/CR-159473 pp. 1-289.
Burgel, R., Grossmann, J., Lusebrink, O., Mughrabi, H., Pyczak, F., Singer, R.F., and Volek, A. (2004). Development of a new alloy for directional solidification of large industrial gas turbine blades. Superalloys 2004. pp. 25-34.
Third Party Observations for European Patent Application No. 13845886.4 by Rolls-Royce dated Nov. 9, 2018.
Third Party Observations for European Patent Application No. 13845886.4 by Rolls-Royce dated Oct. 5, 2018.
European Search Report for European Patent Application No. 20162485.5 dated Jun. 16, 2020.
European Search Report for European Patent Application No. 21213511.5 dated Apr. 26, 2022.

* cited by examiner

REDUCED DEFLECTION TURBINE ROTOR

BACKGROUND

This application relates to gas turbine engines, including turbine rotor and bearing arrangements that may reduce deflections during engine operation.

Gas turbine engines are known, and may include a fan delivering air into a low pressure compressor. The air is compressed in the low pressure compressor, and passed into a high pressure compressor. From the high pressure compressor the air is introduced into a combustor section where it is mixed with fuel and ignited. Products of this combustion pass downstream to a high pressure turbine rotor, and then a low pressure turbine rotor to extract energy for driving the fan.

One or more rotatable shafts may couple the turbine rotors to the compressors and the fan. The shafts may be rotatably supported by one or more bearing assemblies. The turbine rotors may experience various loads during engine operation, which may cause the turbine rotors to deflect outwardly relative to an engine longitudinal axis.

SUMMARY

A turbine section for a gas turbine engine according to an example of the present disclosure includes a first turbine rotor coupled to a first turbine shaft. The first turbine shaft is rotatable about a longitudinal axis. A second turbine rotor is coupled to a second turbine shaft. The second turbine shaft is rotatable about the longitudinal axis, and the second turbine rotor is axially aft of the first turbine rotor relative to the longitudinal axis. An aft bearing assembly rotatably supports the second turbine shaft. The second turbine rotor includes a disk assembly that carries at least one row of turbine blades. The disk assembly is mechanically attached to the second turbine shaft at an attachment point. The attachment point is axially aft of the aft bearing assembly such that an aft portion of the second turbine shaft is cantilevered from the aft bearing system with respect to the longitudinal axis. The disk assembly includes a metallic material. Each of the turbine blades comprises a ceramic matrix composite (CMC) material.

A further embodiment of any of the foregoing embodiments includes a mid-turbine frame between the first turbine rotor and the second turbine rotor. The mid-turbine frame supports the aft bearing assembly, and the mid-turbine frame includes at least one vane extending across a gas path. The at least one row of turbine blades is rotatable in the gas path.

In a further embodiment of any of the foregoing embodiments, no more than 60% of a total weight of the second turbine rotor is defined by metallic materials.

In a further embodiment of any of the foregoing embodiments, at least 40% of a total weight of the second turbine rotor is defined by CMC materials.

In a further embodiment of any of the foregoing embodiments, between 50% and 60% of a total weight of the second turbine rotor is defined by non-metallic materials.

In a further embodiment of any of the foregoing embodiments, the at least one row of turbine blades includes a plurality of rows distributed axially with respect to the longitudinal axis, and an aftmost row of the plurality of rows is axially aft of the second turbine shaft.

In a further embodiment of any of the foregoing embodiments, each of the turbine blades in at least one of the plurality of rows of turbine blades is a shrouded turbine blade.

In a further embodiment of any of the foregoing embodiments, an axial length is established between the aft bearing assembly and an aft end of the second turbine shaft relative to the longitudinal axis, a radial distance is established between the longitudinal axis and a radially outermost portion of the turbine blades in the aftmost row relative to the longitudinal axis, and a ratio of the axial length divided by the radial distance is less than 0.50.

In a further embodiment of any of the foregoing embodiments, a total number of the rows of turbine blades includes at least three rows, but no more than six rows. A cross-sectional area is defined at a downstream end of the second turbine rotor. The second turbine rotor is rotatable at a first speed measured at an engine redline condition, a performance quantity is defined by the cross-sectional area multiplied by the first speed squared, and the performance quantity is greater than or equal to $5.0 \times 10^2$ in$^2$ rpm$^2$.

A turbofan gas turbine engine according to an example of the present disclosure includes a fan section including a fan and a fan case surrounding the fan to define a bypass duct, the fan rotatable about an engine longitudinal axis, and a geared architecture. A compressor section includes a first compressor and a second compressor. A combustor is in fluid communication with the compressor section. A turbine section is in fluid communication with the combustor and includes a first turbine and a fan drive turbine. The first turbine includes a first turbine rotor. A first turbine shaft interconnects the first compressor and the first turbine rotor. The fan drive turbine includes a fan drive turbine rotor. A fan drive turbine shaft interconnects the geared architecture and the fan drive turbine rotor such that the fan drive turbine rotor drives the fan through the geared architecture. The first turbine shaft and the fan drive turbine shaft are concentric and rotatable about the engine longitudinal axis, and the fan drive turbine rotor is axially aft of the first turbine rotor relative to the engine longitudinal axis. A first bearing assembly rotatably supports the first turbine shaft. An aft bearing assembly rotatably supports the fan drive turbine shaft at a position axially aft of the first bearing assembly relative to the engine longitudinal axis. The fan drive turbine rotor includes a disk assembly that carries a plurality of rows of turbine blades. The disk assembly is mechanically attached to the fan drive turbine shaft at an attachment point. The attachment point is axially aft of the aft bearing assembly such that an aft portion of the fan drive turbine shaft is cantilevered from the aft bearing system with respect to the engine longitudinal axis. The disk assembly comprises a metallic material, and each of the turbine blades comprises a ceramic matrix composite (CMC) material.

In a further embodiment of any of the foregoing embodiments, no more than 60% of a total weight of the fan drive turbine rotor is defined by metallic materials.

In a further embodiment of any of the foregoing embodiments, the turbine section includes an array of blade outer air seals arranged about tips of the turbine blades to establish a clearance gap. The clearance gap is less than or equal to 0.03 inches in response to a combined rate of change in pitch and yaw of the engine at 1 radians/second in operation.

In a further embodiment of any of the foregoing embodiments, the turbine section includes a mid-turbine frame between the first turbine and the fan drive turbine, the mid-turbine frame supports the first bearing assembly and the aft bearing assembly. The mid-turbine frame includes at least one vane extending across a gas path, and the turbine blades are rotatable in the gas path.

In a further embodiment of any of the foregoing embodiments, an aftmost row of the plurality of rows of the turbine blades is axially aft of the fan drive turbine shaft.

In a further embodiment of any of the foregoing embodiments, the aftmost row of the plurality of rows of the turbine blades establish an aftmost row of airfoils of the turbofan gas turbine engine.

In a further embodiment of any of the foregoing embodiments, a total number of the rows of the turbine blades includes at least three rows, but no more than six rows.

In a further embodiment of any of the foregoing embodiments, an axial length is established between the aft bearing assembly and an aft end of the fan drive turbine shaft relative to the engine longitudinal axis. A radial distance is established between the engine longitudinal axis and a radially outermost portion of the turbine blades in the aftmost row relative to the engine longitudinal axis, and a ratio of the axial length divided by the radial distance is between 0.2 and 0.4.

In a further embodiment of any of the foregoing embodiments, no more than 60% of a total weight of the fan drive turbine rotor is defined by metallic materials.

In a further embodiment of any of the foregoing embodiments, a total number of the rows of the turbine blades includes no more than four rows.

In a further embodiment of any of the foregoing embodiments, the turbine section includes an array of blade outer air seals arranged about tips of the turbine blades to establish a clearance gap. The clearance gap is less than or equal to 0.03 inches in response to a combined rate of change in pitch and yaw of the engine at 1 radian/second in operation.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
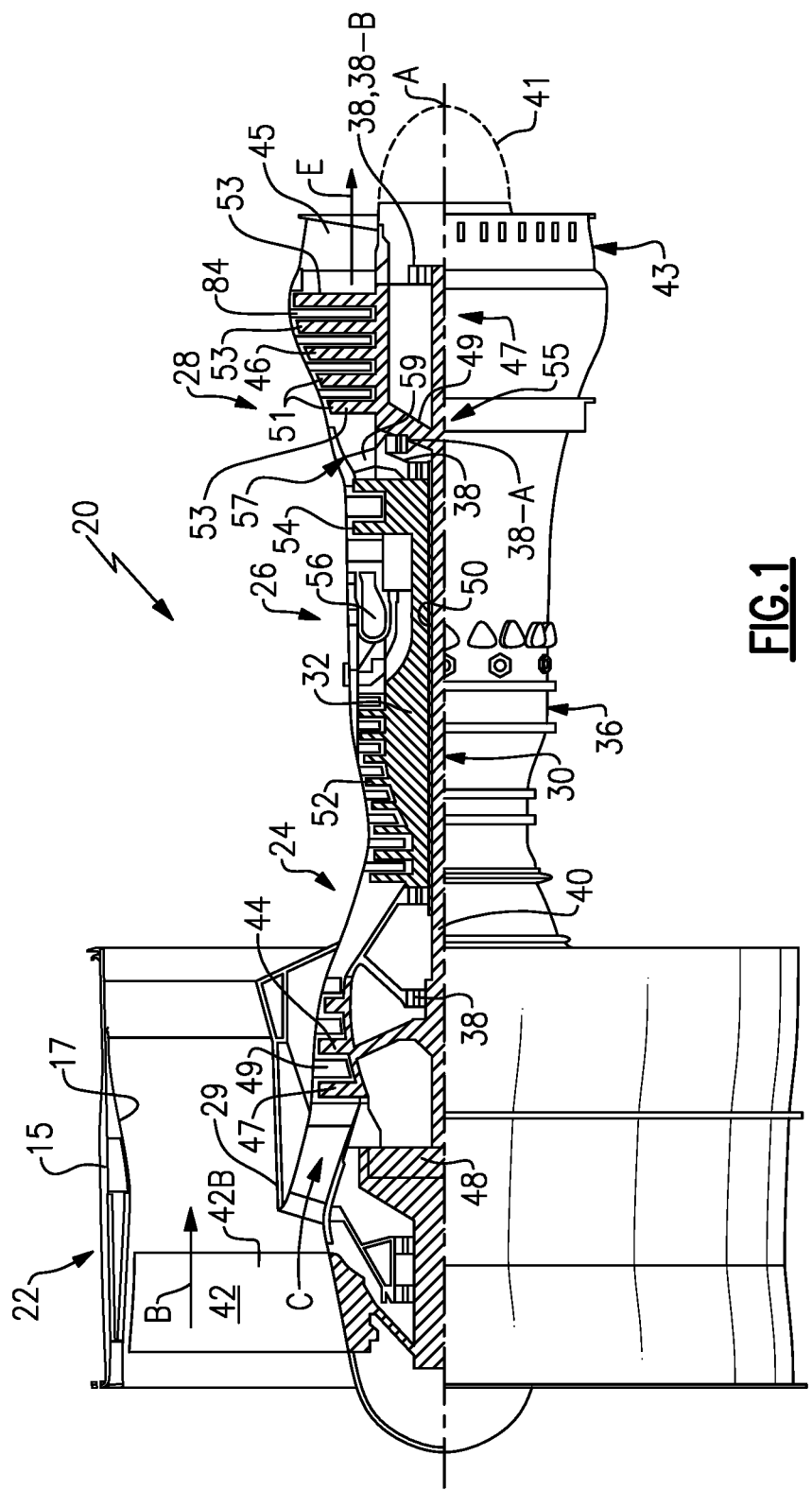
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 42B. The fan blades 42B may have a fixed stagger angle or may have a variable pitch to direct incoming airflow from an engine inlet. The fan 42 drives air along a bypass flow path B in a bypass duct 17 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 17. The splitter 29 may establish an inner diameter of the bypass duct 17. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils (e.g., turbine blades) are schematically indicated at 53, and the vanes are schematically indicated at 84.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 42B alone, without a Fan Exit Guide Vane ("FEGV") system. A distance is established in a radial direction between the inner and outer diameters of the bypass duct 17 at an axial position corresponding to a leading edge of the splitter 29 relative to the engine central longitudinal axis A. The fan pressure ratio is a spanwise average of the pressure ratios measured across the fan blade 42B alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The engine 20 can include a turbine exhaust case (TEC) 43 axially aft of the turbine section 28. The TEC 43 can include at least one row of turning vanes (or struts) 45 that extend across the core flow path C (one vane 45 shown in FIG. 1 for illustrative purposes). The vanes 45 can be structural members arranged to support at least one of the bearing systems 38.

The low pressure turbine 46 includes a turbine rotor 47 rotatable about the longitudinal axis A. The turbine rotor 47 is coupled to the inner turbine shaft 40, which is rotatable about the longitudinal axis A. The turbine rotor 47 includes a disk assembly 49 that carries one or more rows 51 of turbine blades 53. The disk assembly 49 is mechanically attached to the inner turbine shaft 40 at an attachment point (or connection) 55.

The bearing systems (or assemblies) 38 are arranged to define a bearing configuration 60 that supports the inner shaft 40 and the outer shaft 50. In the illustrative example of FIG. 1, the bearing configuration 60 includes a first (or aft) bearing assembly 38-A and a second (or aft) bearing assembly 38-B that rotatably support the inner shaft 40 on opposed sides of the attachment point 55. The TEC 43 can support the second bearing assembly 38-B via the row of vanes 45. The TEC 43 can also support a tail cone 41 (shown in dashed lines for illustrative purposes). The tail cone 41 extends axially aft of the turbine section 28 and can be dimensioned to establish an inner boundary for exhaust gases E communicated in the core flow path C from the low pressure turbine 46. In some examples, the engine 20 excludes a TEC.

Figure 2:
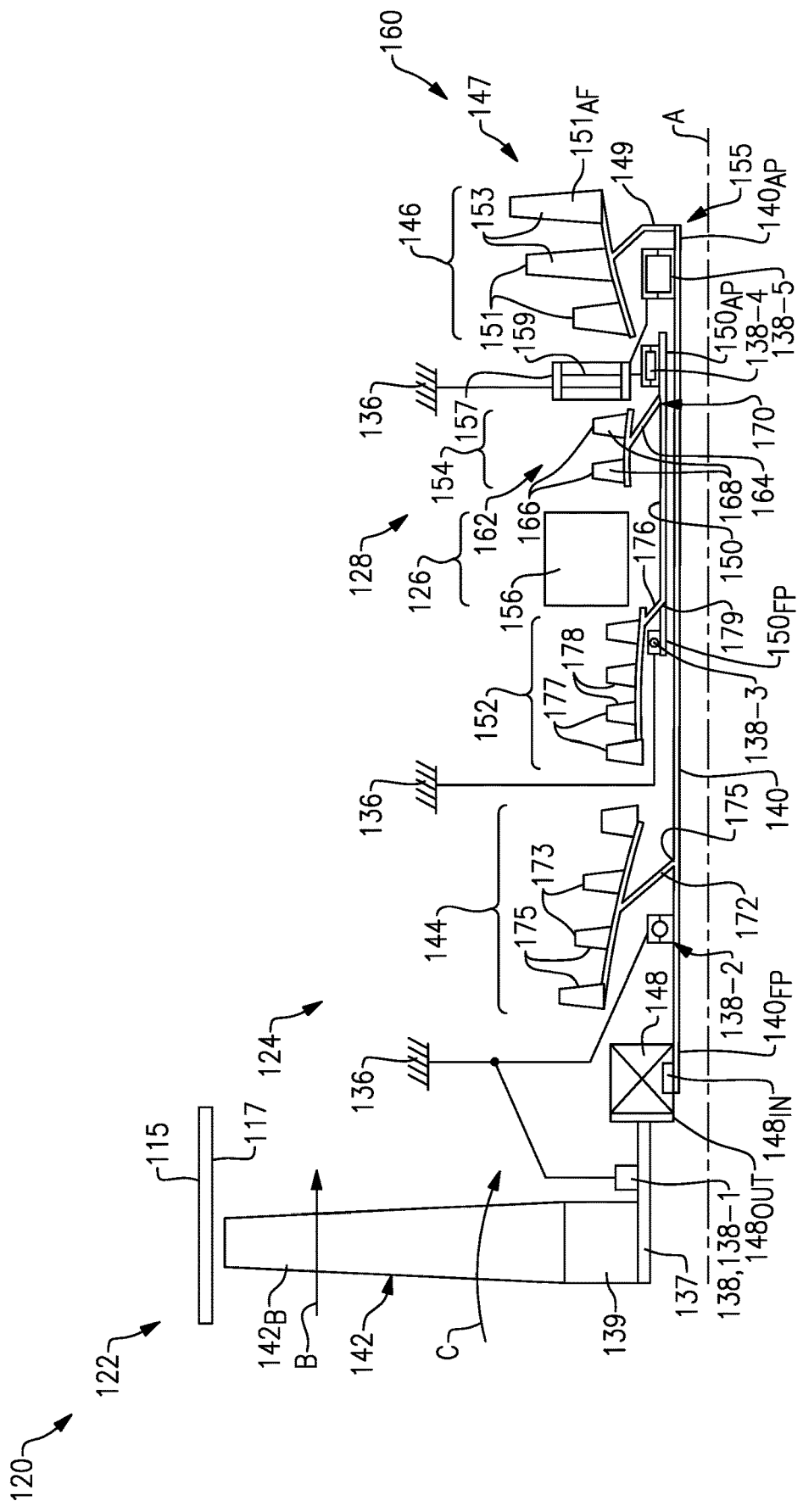
FIG. 2 illustrates a gas turbine engine including a bearing configuration.

FIG. 2 illustrates an example turbofan gas turbine engine 120 including a bearing configuration 160. The bearing configuration 160 may be incorporated into a gas turbine engine such as the turbofan gas turbine engine 20 of FIG. 1. Other systems may benefit from the teachings disclosed herein, including gas turbine engines lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The engine 120 can include a fan section 122, a compressor section 124, a combustor section 126 and a turbine section 128. The fan section 122 includes a fan 142 and a fan case 115 surrounding the fan 142 to define a bypass duct 117 (see also FIG. 1). The fan 142 is rotatable about an engine longitudinal axis A to deliver airflow to the bypass duct 117. The gas turbine engine 120 can be rated to produce about 15,000 pounds of thrust or more at a takeoff condition, or more narrowly between about 20,000 and about 60,000 pounds of thrust at the takeoff condition.

The compressor section 124 can include a first (or low) pressure compressor 144 and a second (or high) pressure compressor 152. The turbine section 128 can include a first (or high) pressure turbine 154 and a second (or fan drive) turbine 146. The combustor section 126 can include a combustor 156 in fluid communication with the compressors 144, 152 and the turbines 146, 154. The engine 120 can include an outer (e.g, first or first turbine) shaft 150 and an inner (e.g., second or fan drive turbine) shaft 140. The inner shaft 140 and outer shaft 150 can be concentric and are rotatable about the longitudinal axis A.

The high pressure turbine 154 includes a first (or high pressure) turbine rotor 162 rotatable about the longitudinal axis A. The turbine rotor 162 can be coupled to the outer shaft 150. The turbine rotor 162 includes a hub 164 that carries one or more rows 166 of turbine blades 168. The hub 164 is supported by and mechanically attached to the outer shaft 150 at an attachment point (or connection) 170 along the outer shaft 150. The outer shaft 150 can interconnect the high pressure compressor 152 and the turbine rotor 162. A total number of the rows 166 of the turbine blades 168 of the turbine rotor 162 can include at least one or two rows 166, for example. Each row 166 of turbine blades 168 can include any of the blade configurations and materials disclosed herein, including unshrouded and shrouded turbine blades constructed of ceramic matrix composite (CMC) and other ceramic materials.

The low pressure turbine 146 includes a second (or fan drive) turbine rotor 147 rotatable about the longitudinal axis A. The turbine rotor 147 can be coupled to the inner shaft 140. The turbine rotor 147 includes a disk assembly 149 that carries at least one or more rows 151 of turbine blades 153. The disk assembly 149 is supported by and mechanically attached to the inner shaft 140 at an attachment point (or connection) 155 along the inner shaft 140, which can be axially aft of the attachment point 170 relative to the longitudinal axis A. The fan drive turbine rotor 147 can be axially aft of the high pressure turbine rotor 162 relative to the longitudinal axis A, as illustrated in FIG. 2. The turbine rotor 147 can include two or more rows 151 of turbine blades 153 distributed axially with respect to the longitudinal axis A. A total number of the rows 151 of the turbine blades 153 of the turbine rotor 147 can include at least three rows, but no more than six rows 151, such as four or five rows 151, for example.

The low pressure compressor 144 includes a hub 172 that carries one or more rows 173 of compressor blades 175. The hub 172 is mechanically attached to the inner shaft 140 at an attachment point (or connection) 175. The high pressure compressor 152 includes a hub 176 that carries one or more rows 177 of compressor blades 178. The hub 176 is mechanically attached to the outer shaft 150 at an attachment point (or connection) 179, which can be axially aft of the attachment point 155 relative to the longitudinal axis A.

The engine 120 can include a geared architecture 148 that interconnects the inner shaft 140 and the fan 142. The geared architecture 148 includes an input $148_{IN}$ driven by the inner shaft 140 and an output input $148_{OUT}$ that drives a fan shaft 137. The fan shaft 137 interconnects the output $148_{OUT}$ and a fan rotor 139 carrying the fan blades $142_B$ of the fan 142.

The geared architecture 148 can be an epicyclic gear train including at least a sun gear, a ring gear, a plurality of intermediate gears enmeshing with the sun gear and the ring gear, and a carrier that supports the plurality of intermediate gears. The input $148_{IN}$ can be the sun gear, and the output $148_{OUT}$ can be the carrier or ring gear, for example, such that the fan 142 rotates at a different (e.g., lower) speed than a speed of the inner shaft 140. In other examples, the geared architecture 148 is omitted such that the inner shaft 140 and the fan shaft 137 are rotatably at a common speed and in a common direction.

The bearing configuration 160 includes a plurality of bearing assemblies (or systems) 138 that rotatably support the fan shaft 137, the inner shaft 140 and the outer shaft 150. The inner shaft 140 can interconnect the geared architecture 148 and the fan drive turbine rotor 147 such that the fan drive turbine rotor 147 drives the fan 142 through the geared architecture 148.

The bearing configuration 160 can include a first bearing assembly 138-1 that rotatably support the fan shaft 137 forward of the geared architecture 148. The bearing configuration 160 can include one or more bearing assemblies 138 axially aft of the geared architecture 148, such as forward (or second) bearing assembly 138-2, a forward (or third) bearing assembly 138-3, an aft (or fourth bearing assembly 138-4), and an aft (or fifth) bearing assembly 138-5. Although only five bearing assemblies 138 are shown, it should be understood that the bearing configuration 160 can include fewer or more than five bearing assemblies 138 including one or more bearing assemblies 138 adjacent to any of the bearing assemblies 138-1 to 138-5.

In the illustrative example of FIG. 2, the bearing assembly 138-2 is arranged to rotatably support a forward portion $140_{FP}$ of the inner shaft 140. The bearing assembly 138-3 is arranged to rotatably support a forward portion $150_{FP}$ of the outer shaft 150. The bearing assembly 138-4 is arranged to rotatably support an aft portion $150_{AP}$ of the outer shaft 150. The bearing assembly 138-5 is arranged to rotatably support an aft portion $140_{AP}$ of the inner shaft 140. The bearing assembly 138-5 can rotatably support the inner shaft 140 at a position axially aft of the bearing assembly 138-4 relative to the longitudinal axis A.

The bearing assembly 138-5 can be an aftmost bearing assembly 138 of the bearing configuration 160 that supports the shafts 140, 150 of the turbine section 128. For example, the attachment point 155 can be axially aft of the bearing assembly 138-5 such that the aft portion $140_{AP}$ of the inner shaft 140 is cantilevered from the bearing system 138-5 with respect to the longitudinal axis A, as illustrated in FIG. 2. Positioning of the bearing assembly 138-5 forward of the attachment point 155 can reduce an overall length of the engine 120. An aftmost row $151_{AF}$ of the rows 151 of the turbine blades 153 of the fan drive turbine rotor 147 can be axially aft of the inner shaft 140 relative to the longitudinal axis A, as illustrated in FIG. 2. Eliminating bearing assemblies aft of the attachment point 155 to support the inner shaft 140 can reduce structural demands that may otherwise be imposed on the support structure, including the turbine case 180, and can reduce lubricant and cooling flow demands of the bearing configuration 160. The engine 120 may exclude any TEC such that the aftmost row $151_{AF}$ of the turbine blades 153 establish an aftmost row of airfoils of the engine 120.

The turbine section 128 can include a mid-turbine frame 157 between the high pressure turbine rotor 162 and the fan drive turbine rotor 147 relative to the longitudinal axis A. The mid-turbine frame 157 can be a portion of the engine static structure 136. The mid-turbine frame 157 can support one or more of the bearing assemblies 138, including the bearing assembly 138-4 and/or bearing assembly 138-5. The mid-turbine frame 157 can serve to establish a common support structure for the bearing assemblies 138-4, 138-5, which may reduce a complexity, weight and/or overall length of the engine 120.

The mid-turbine frame 157 can include at least one row of airfoils (or vanes) 159 that extend at least partially or completely across a gas path, such as the core flow path C. The rows 166 of turbine blades 168 and the rows 151 of turbine blades 153 are rotatable in the gas path defined by and extending through the mid-turbine frame 157, such as the core flow path C.

Figure 3:
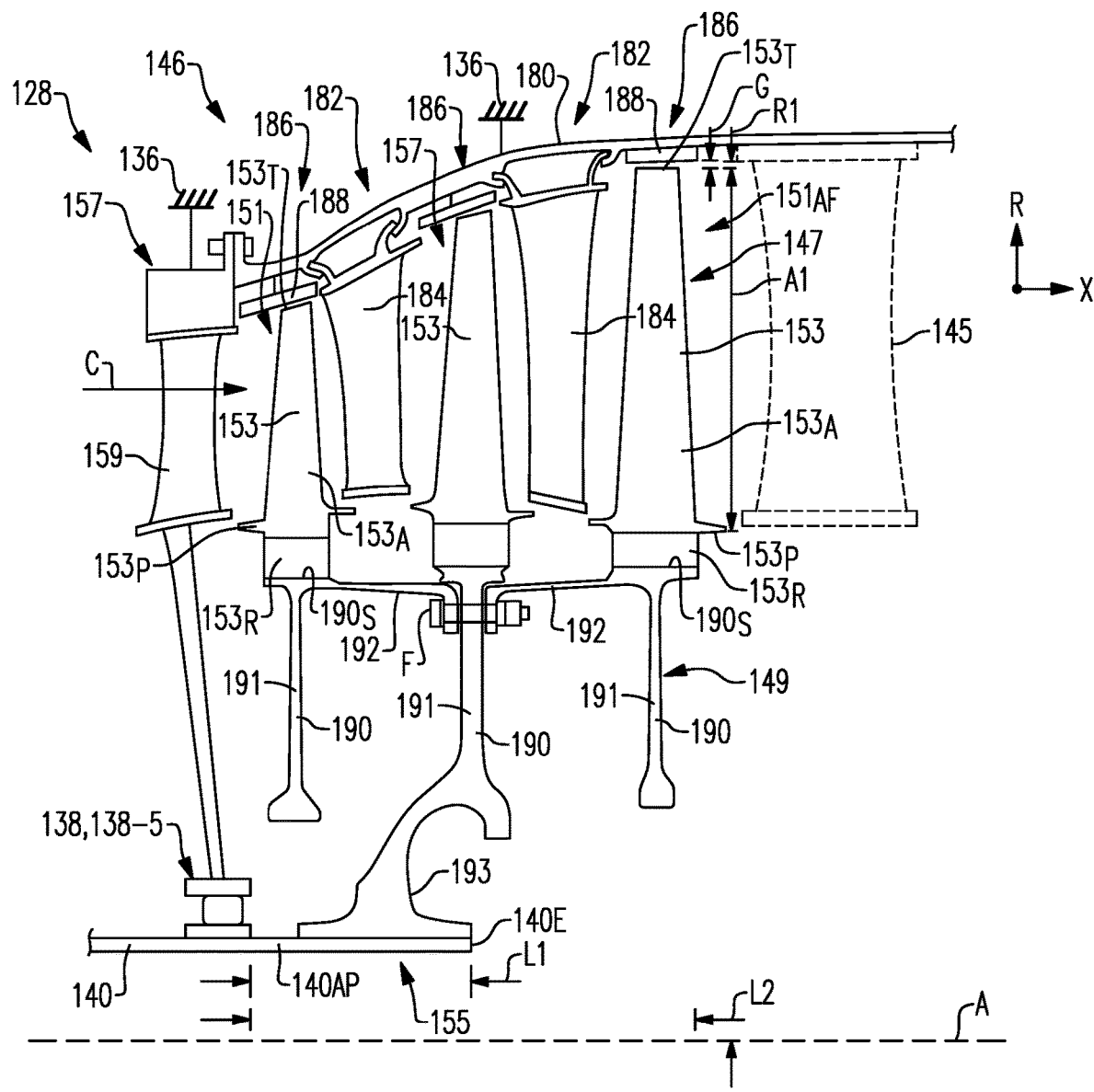
FIG. 3 illustrates a turbine section of the gas turbine engine of FIG. 2.

In the illustrative example of FIG. 2, the engine 120 lacks a turbine exhaust case (TEC) that supports a bearing assembly axially aft of the attachment point 155. Eliminating a TEC can reduce a complexity and overall weight of the engine 120. The engine 120 can include one or more rows of turning vanes 145 axially aft and downstream of the last row $151_{AF}$ of turbine blades 153, as illustrated in FIG. 3 (vane 145 shown in dashed lines for illustrative purposes). The turning vanes 145 can be configured to support a tailcone (see FIG. 1). Eliminating a bearing assembly axially aft of the attachment point 155 can also reduce complexity of removing the turbine rotor 147. For example, the tailcone can be removed, and the turbine rotor 147 can be moved in an axially aft direction along the longitudinal axis A once the turbine rotor 147 is unfastened from the inner shaft 140.

In operation, the turbine rotor 147 rotates to drive the inner shaft 140, which causes the compressor hub 172 and fan rotor 139 to rotate. Rotation of the fan rotor 139 via the fan shaft 137 causes the fan 142 to deliver airflow into the bypass duct 117. The bearing assembly 138-5 rotatably supports the inner shaft 140. The turbine rotor 162 rotates to drive the outer shaft 150, which causes the compressor hub 176 to rotate. The bearing assembly 138-4 rotatably supports the outer shaft 150.

Referring to FIG. 3, with continuing reference to FIG. 2, each turbine blade 153 can include an airfoil section $153_A$ that extends in a radial direction from a platform $153_P$ to a tip $153_T$. The platform $153_P$ can be integrally formed with the airfoil section $153_A$ or can be a separate and distinct component. Each turbine blade 153 includes a root section 153B mechanically attached or otherwise secured to the disk assembly 149.

The fan drive turbine 146 can include a turbine case 180 (see also turbine case 80 of FIG. 1), and one or more rows 182 of turbine vanes 184 arranged downstream and axially aft of adjacent rows 151 of turbine blades 153. One or more rows 186 of blade outer air seals (BOAS) 188 can be arranged in an array about and radially outward of each respective row 151 of turbine blades 153. The BOAS 188 are positioned in close proximity to the tips 153T of the turbine blades 153 to establish a respective clearance gap G. The vanes 184 and BOAS 188 can be mechanically attached to the turbine case 180 or another portion of the engine static structure 136.

A dimension of the clearance gap G may change during engine operation due to various factors, including thermal growth of the turbine case 180 due to relatively hot gases communicated in the core flow path C. The dimension of the clearance gap G may change due to other factors, such as gyroscopic precession of the turbine rotor 147 due to forces imposed on the turbine rotor 147 by various maneuvers of the aircraft including changes in pitch and/or yaw. Gyroscopic precession of the turbine rotor 147 may cause the turbine rotor 147 to deflect relative to the engine longitudinal axis A.

The disk assembly 149 includes one or more discs 190 that are dimensioned to carry a respective row 151 of the turbine blades 153. Each disk 190 includes a disk portion 191 defining one or more slots 190s distributed about an outer diameter of the disk portion 191. The root section 153B of the turbine blades 153 can be received in a respective one of the slot 190s of the discs 190 to mount the turbine blades 153 to the disk assembly 149. The discs 190 are mechanically attached to each other such that the discs 190 and the turbine blades 153 rotate together as a unit about the longitudinal axis A. The disk assembly 149 can include one or more connecting arms 192 that mechanically attach the disc portions 191 of adjacent discs 190 together with one or more fasteners F, for example. One or more of the disks 190 can include a hub or attachment portion 193 extending from the disk portion 191. The hub 193 can mechanically attach and interconnect the disk assembly 149 to the inner shaft 140 at the attachment point 155. The hub 193 can be dimensioned to have a relatively greater thickness and/or mass than the respective disk portion 191 as illustrated in FIG. 3, but may not contribute relatively high amounts of centrifugal loading on the disk assembly 149 due to the proximity of the hub 193 to the engine axis A. Although FIG. 3 illustrates only one of the disks 190 having a hub 193, it should be understood that more than one or each of the disks 190 may have a respective hub 193 coupled to the inner shaft 140.

Various materials may be utilized to construct the turbine rotor 147. The disk assembly 149 including each of the disks 190 and the respective disk portions 191 and hub 193 can be constructed of a first material, and the turbine blades 153 can be constructed of a second material. The second material can be the same or can differ from the first material. For example, the disk assembly 149 including each of the disks 190 and the respective disk portions 191 and hub 193 can comprise a metallic material, and the turbine blades 153 can comprise a non-metallic material such as a ceramic material. In examples, the disk assembly 149 including each of the disks 190 and the respective disk portions 191 and hub 193 is substantially metallic. A composition of each of the disks 190 may be the same or may differ. For the purposes of this disclosure, the terms "approximately", "about" and "substantially" mean±5 percent of the stated value or relationship unless otherwise indicated. Metallic materials can include metals and alloys, such as a nickel or cobalt-based superalloy, for example. The turbine blades 153 may be constructed from various ceramic materials. For example, one or more (or each) of the rows 151 of the turbine blades 153 may comprise a monolithic ceramic or CMC material. Various CMC materials can be utilized, including one or more layers having various fiber constructions of ceramic fibers in a matrix. Example fiber constructions can include uni-tape plies, fabrics, two-dimensional and three-dimensional weaves of fibers. Uni-tape plies include fibers oriented in the same direction ("uni-directional"), and fabrics includes woven or interlaced fibers. Other fiber materials can be utilized, including carbon, aramid, and/or a combination of materials.

Constructing the turbine blades 153 according to the materials disclosed herein, including the airfoil section $153_A$ and/or the root section 153B, can reduce centrifugal loading and structural demands on the disk assembly 149 including the disks 190, and can reduce a weight and spinning mass of the turbine rotor 147. A reduction in weight can reduce a moment of inertia of the turbine rotor 147 by as much as 50% or more during engine operation. The reduced deflection may be utilized to omit any bearings to support the shaft 140 aft of an attachment point 155 of the rotor 147, along with support structure, lubrication, cooling and other hardware to support such a bearing, which may reduce an overall weight of the engine 120 and improve efficiency.

Various proportions of materials can be utilized to reduce axial and/or radial deflections of the turbine rotor 147 in operation. In examples, no more than about 60% of a total weight of the turbine rotor 147 is defined by metallic materials including the disk assembly 149, or more narrowly at least about 20% of the total weight. In some examples, no more than about 50% of the total weight of the turbine rotor 147 is defined by metallic materials, such as between about 40% and about 50% of the total weight. At least about 40% of the total weight of the turbine rotor 147 can be defined by non-metallic materials, including CMC and other ceramic materials, or more narrowly no more than about 70% of the total weight. In examples, between about 50% and about 60% of the total weight of the turbine rotor 147 is defined by non-metallic materials, including CMC and other ceramic materials. The total weight of the turbine rotor 147 includes all rotating components coupled together to rotate as a unit, including any seals, fasteners, etc. The metallic components of the disk assembly 149 can exclude at least the turbine blades 153, and the non-metallic components of the disk assembly 149 can exclude at least the disks 190 and connecting arms 192.

The fan drive turbine 146 can be dimensioned to establish a relatively compact arrangement. An axial length L1 can be established in an axial direction X between the bearing assembly 138-5 and an aft end 140E of the inner shaft 140 relative to the longitudinal axis A. A radial distance R1 can be established in a radial direction R between the longitudinal axis A and a radially outermost portion of the turbine blades 153 in the aftmost row $151_{AF}$ relative to the longitudinal axis A, which can be established by the tips $153_T$ of the turbine blades 153. A ratio L1:R1 of the axial length L1 divided by the radial distance R1 can be less than or equal to about 0.5, or more narrowly between about 0.2 and about 0.4, such as about 0.25, for example.

The compact arrangement of the fan drive turbine 146 can be utilized to reduce a length of the inner shaft 140. An axial length L2 can be established in the axial direction X between the bearing assembly 138-5 and an axially aftmost portion of a trailing edge $153_{TE}$ of the turbine blades 153 in the aftmost row $151_{AF}$. A ratio L1:L2 can be less than or equal to about 0.7, or more narrowly greater than or equal to about 0.5.

The fan drive turbine 146 can establish a relatively high speed, compact arrangement. A first cross-sectional area A1 is defined at a downstream end of the turbine rotor 147. The turbine rotor 147 is rotatable at a first speed N measured at an engine redline condition. A performance quantity (AN²) of the turbine rotor 147 is defined by the cross-sectional area A1 multiplied by the first speed N squared. The performance quantity can be at equal to or greater than about 5.0 times 10 squared ($5.0 \times 10^2$) in² rpm², or more narrowly less than or equal to about $6.0 \times 10^2$ in² rpm². The first speed N can be between about 10,000 and about 15,000 rpm at the redline condition, for example.

Figure 4:
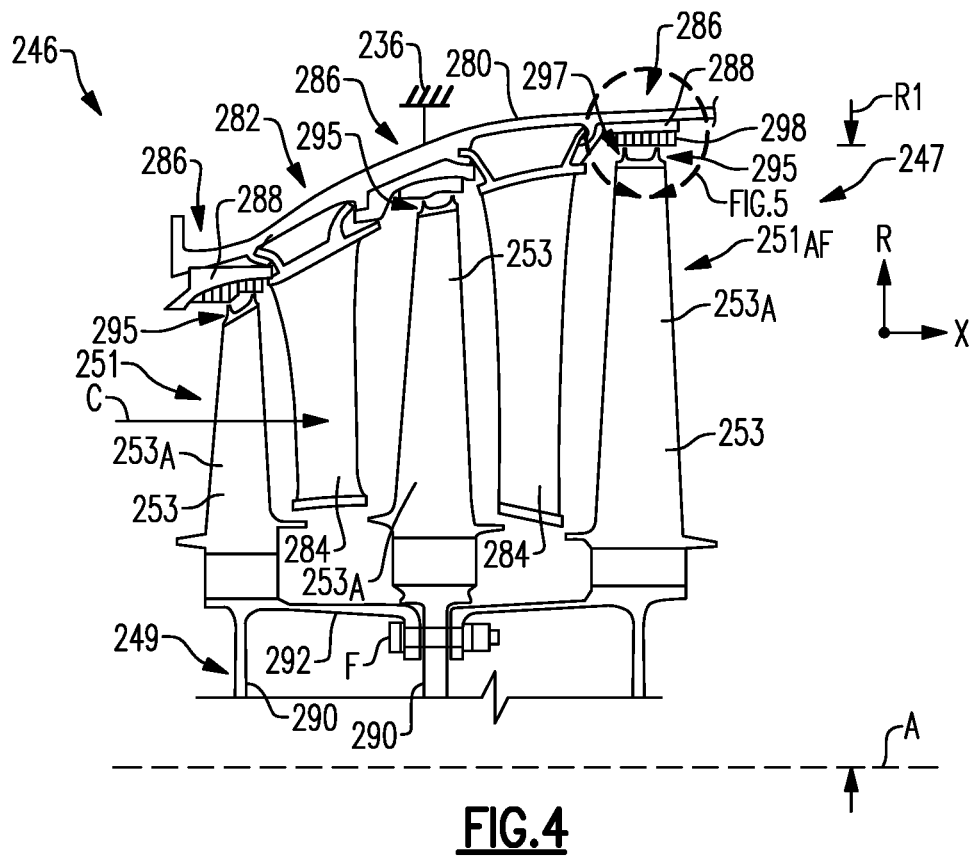
FIG. 4 illustrates a turbine according to another example.

Other turbine blade configurations may be utilized with the teachings disclosed herein. In the illustrative example of FIG. 4, turbine 246 includes one or more rows 251 of shrouded turbine blades 253. Each of the turbine blades 253 includes an airfoil section $253_A$ and a shroud 295 extending from an outer periphery of the airfoil section $253_A$. The shroud 295 is dimensioned to face an adjacent row 286 of BOAS 288. Although each row 251 of turbine blades 253 is illustrated as a shrouded turbine blade 253, it should be understood that the turbine 246 can have one or more rows of unshrouded turbine blades (see, e.g., turbine blades 153 of FIG. 3). The shroud 295 may be made of any of the materials disclosed herein, including metallic materials. A radial distance R1 can be established in a radial direction R between the longitudinal axis A and a radially outermost portion of the turbine blades 253 in the aftmost row $251_{AF}$ relative to the longitudinal axis A. The radially outermost portion of the turbine blade 253 can be established by the shroud 295, as illustrated in FIG. 4. The turbine blades 253 can be arranged to establish any of the values of the ratio L1:R1 disclosed herein.

Figure 5:
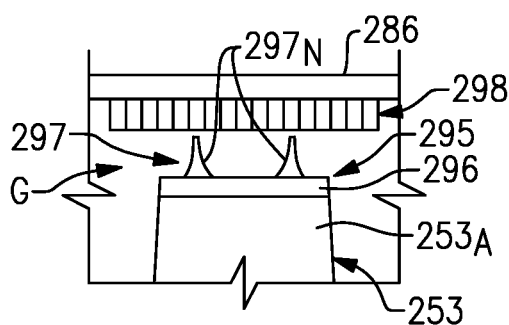
FIG. 5 illustrates portions of the turbine of FIG. 4.

Referring to FIG. 5, with continuing reference to FIG. 4, the shroud 295 can include a base portion 296 mechanically attached or otherwise secured to the outer periphery of the airfoil section $253_A$. The shroud 295 can include a first sealing feature 297 extending outwardly from the base portion 296. The first sealing feature 297 can include one or more knife edge features $297_N$, for example. Each of the knife edge feature $297_N$ can include various geometries extending in axial and/or radial directions X, R. The knife edge feature $297_N$ can reduce a dynamic pressure component of the total pressure of the leakage flow through the clearance gap G. Each BOAS 288 can include a second sealing feature 298 arranged to face the shroud 295. The first sealing feature 297 and second sealing feature 298 cooperate to establish a sealing relationship along a clearance gap G between the BOAS 288 and airfoil 253. The second sealing feature 298 can be formed from an abradable, ceramic or nickel-based alloy material, for example, such that the shroud 295 of each turbine blade 253 cuts or machines a relatively small leakage path through the clearance gap G for all flight conditions, accounting for the different relative thermal characteristics of the shrouded rotor blades 251, disk assembly 249 and turbine case 280, as well as the various loads and resulting deflections experienced by the turbine rotor 247. The reduced leakage of gases through the clearance gap G can improve overall efficiency of the turbine 246.

Figure 6:
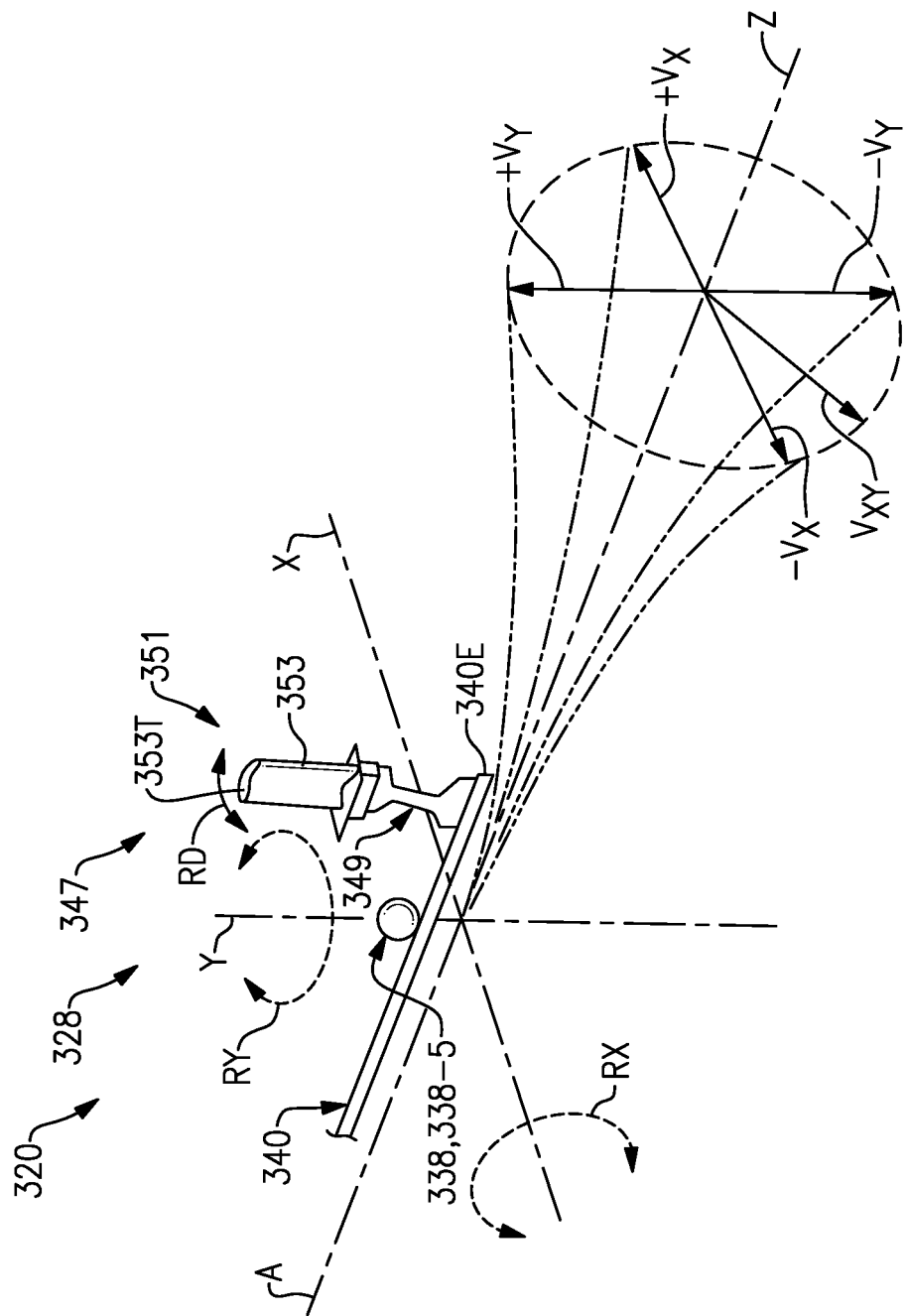
FIG. 6 illustrates a gas turbine engine according to another example.

FIG. 6 illustrates a schematic illustration of a gas turbine engine 320 according to another example. The engine 320 includes a rotor 347. An outer diameter portion of a shaft 340 rotatably supported by a bearing 338, such as a bearing 338-5 (one bearing shown for illustrative purposes). The shaft 338 extends along a Z-axis, which may coincide with or may otherwise be parallel to an engine longitudinal axis A. The Z-axis is perpendicular to an X-axis and Y-axis. A portion of the shaft 338 between the bearing 338 and an end 340E of the shaft 338 may be cantilevered from the bearing 338 as shown. The cantilevered portion of the shaft 338 may support at least one disk assembly 349 carrying at least one blade 353 (one shown for illustrative purposes). Each blade 353 is rotatable in a direction RD about the Z-axis. The bearing 338 may serve to support the rotor 347, but may not completely eliminate bending of the shaft 338 due to the cantilever arrangement.

During operation, the rotor 347 may experience gyroscopic precession due to pivoting motions in a rotational direction RX about the X-axis and/or a rotational direction RY about the Y-axis caused by respective changes in pitch and yaw of an aircraft associated with the engine 320. This may occur during each phase of a flight, including takeoff, cruise, approach and landing conditions. The rotor 347 and each blade 353 may experience radial deflection relative to a design (e.g., normal) position of the engine longitudinal axis A due to the gyroscopic precession. The radial deflection may occur along a vector $V_{XY}$ due to the changes in pitch and/or yaw. The vector $V_{XY}$ may have a first component $V_X$ and a second component $V_Y$. The first component $V_X$ may correspond to a positive or negative change in pitch, and the second component $V_Y$ may correspond to a positive or negative change in yaw. The components $V_X$, $V_Y$ may be positive or negative in value. Changes in pitch and yaw may be expressed in radians/second. Any combination of pitch rate and yaw rate will combine to cause a centerline of the rotor 347 to deflect both horizontally relative to the X-axis and vertically relative to the Y-axis, as illustrated in FIG. 6.

The techniques disclosed herein, including incorporation of turbine blades including CMC and other ceramic materials and bearing arrangements, can reduce spinning mass of the rotor and can be utilized to establish a relatively low amount of deflection caused by maneuvering of the aircraft. For example, the clearance gap G (see FIG. 3) can be less than or equal to 0.03 inches, or more narrowly less than or equal to 0.02 inches, in response to a combined rate of change in pitch and yaw of the engine 320 at 1 radians/second in operation. As previously noted, the reduced deflection may be utilized to omit any bearings to support the shaft aft of an attachment point of the rotor, which may reduce an overall weight of the engine and improve efficiency.

The arrangements disclosed herein can be utilized to establish a relatively compact engine. The disclosed turbine rotors including ceramic-based materials such as CMC materials can reduce spinning mass, deflections and gyroscopic procession by as much as 50% or more, thereby improving rotor dynamics and turbine efficiency. The reduced deflections of the turbine rotor can reduce a likelihood of blade degradation or loss. An overall weight of the engine may be reduced by as much as 10-15% or more.

The techniques disclosed herein can reduce an overall weight of the engine, which can reduce complexity and weight of engine mounts, for example.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A turbine section for a gas turbine engine, comprising:
a first turbine rotor coupled to a first turbine shaft, the first turbine shaft rotatable about a longitudinal axis;
a second turbine rotor coupled to a second turbine shaft, the second turbine shaft rotatable about the longitudinal axis, and the second turbine rotor being axially aft of the first turbine rotor relative to the longitudinal axis;
an aft bearing assembly that rotatably supports the second turbine shaft;
wherein the second turbine rotor includes a disk assembly that carries at least one row of a plurality of turbine blades, the disk assembly is mechanically attached to the second turbine shaft at an attachment point, and the attachment point is axially aft of the aft bearing assembly such that an aft portion of the second turbine shaft is cantilevered from the aft bearing assembly with respect to the longitudinal axis;
wherein the disk assembly comprises a metallic material, and each of the turbine blades comprises a ceramic matrix composite (CMC) material;
wherein at least 40% of a total weight of the second turbine rotor is defined by CMC materials;
wherein the at least one row of turbine blades includes a plurality of rows distributed axially with respect to the longitudinal axis, and an aftmost row of the plurality of rows is axially aft of the second turbine shaft; and
wherein an axial length is established between the aft bearing assembly and an aft end of the second turbine shaft relative to the longitudinal axis, a radial distance is established between the longitudinal axis and a radially outermost portion of the turbine blades in the aftmost row relative to the longitudinal axis, and a ratio of the axial length divided by the radial distance is less than 0.50.

2. The turbine section as recited in claim 1, further comprising:
a mid-turbine frame between the first turbine rotor and the second turbine rotor, the mid-turbine frame supporting the aft bearing assembly, and the mid-turbine frame including at least one vane extending across a gas path, and the at least one row of turbine blades is rotatable in the gas path.

3. The turbine section as recited in claim 1, wherein no more than 60% of a total weight of the second turbine rotor is defined by metallic materials.

4. A turbine section for a gas turbine engine, comprising:
a first turbine rotor coupled to a first turbine shaft, the first turbine shaft rotatable about a longitudinal axis;
a second turbine rotor coupled to a second turbine shaft, the second turbine shaft rotatable about the longitudinal axis, and the second turbine rotor being axially aft of the first turbine rotor relative to the longitudinal axis;
an aft bearing assembly that rotatably supports the second turbine shaft;
wherein the second turbine rotor includes a disk assembly that carries at least one row of a plurality of turbine blades, the disk assembly is mechanically attached to the second turbine shaft at an attachment point, and the attachment point is axially aft of the aft bearing assembly such that an aft portion of the second turbine shaft is cantilevered from the aft bearing assembly with respect to the longitudinal axis;
wherein the disk assembly comprises a metallic material, and each of the turbine blades comprises a ceramic matrix composite (CMC) material;
a mid-turbine frame between the first turbine rotor and the second turbine rotor, the mid-turbine frame supporting the aft bearing assembly, and the mid-turbine frame including at least one vane extending across a gas path, and the at least one row of turbine blades is rotatable in the gas path;
wherein no more than 60% of a total weight of the second turbine rotor is defined by metallic materials;
wherein the at least one row of turbine blades includes a plurality of rows distributed axially with respect to the longitudinal axis, and an aftmost row of the plurality of rows is axially aft of the second turbine shaft; and
wherein an axial length is established between the aft bearing assembly and an aft end of the second turbine shaft relative to the longitudinal axis, a radial distance is established between the longitudinal axis and a radially outermost portion of the turbine blades in the aftmost row relative to the longitudinal axis, and a ratio of the axial length divided by the radial distance is less than 0.50.

5. A turbine section for a gas turbine engine, comprising:
a first turbine rotor coupled to a first turbine shaft, the first turbine shaft rotatable about a longitudinal axis;
a second turbine rotor coupled to a second turbine shaft, the second turbine shaft rotatable about the longitudinal axis, and the second turbine rotor being axially aft of the first turbine rotor relative to the longitudinal axis;

an aft bearing assembly that rotatably supports the second turbine shaft;

wherein the second turbine rotor includes a disk assembly that carries at least one row of a plurality of turbine blades, the disk assembly is mechanically attached to the second turbine shaft at an attachment point, and the attachment point is axially aft of the aft bearing assembly such that an aft portion of the second turbine shaft is cantilevered from the aft bearing assembly with respect to the longitudinal axis;

wherein the disk assembly comprises a metallic material, and each of the turbine blades comprises a ceramic matrix composite (CMC) material;

wherein between 50% and 60% of a total weight of the second turbine rotor is defined by non-metallic materials;

wherein the at least one row of turbine blades includes a plurality of rows distributed axially with respect to the longitudinal axis, and an aftmost row of the plurality of rows is axially aft of the second turbine shaft; and wherein an axial length is established between the aft bearing assembly and an aft end of the second turbine shaft relative to the longitudinal axis, a radial distance is established between the longitudinal axis and a radially outermost portion of the turbine blades in the aftmost row relative to the longitudinal axis, and a ratio of the axial length divided by the radial distance is less than 0.50.

6. The turbine section as recited in claim 5, wherein each of the turbine blades in at least one of the plurality of rows of turbine blades is a shrouded turbine blade.

7. The turbine section as recited in claim 5, wherein:

a total number of the rows of turbine blades includes at least three rows, but no more than six rows; and wherein a cross-sectional area is defined at a downstream end of the second turbine rotor, the second turbine rotor is rotatable at a first speed measured at an engine redline condition, a performance quantity is defined by the cross-sectional area multiplied by the first speed squared, and the performance quantity is greater than or equal to $5.0 \times 10^2$ in$^2$ rpm$^2$.

8. A turbofan gas turbine engine comprising:

a fan section including a fan and a fan case surrounding the fan to define a bypass duct, the fan rotatable about an engine longitudinal axis;

a geared architecture;

a compressor section including a first compressor and a second compressor;

a combustor in fluid communication with the compressor section;

a turbine section in fluid communication with the combustor and including a first turbine and a fan drive turbine, wherein the first turbine includes a first turbine rotor, a turbine shaft interconnects the first compressor and the first turbine rotor, the fan drive turbine includes a fan drive turbine rotor, a fan drive turbine shaft interconnects the geared architecture and the fan drive turbine rotor such that the fan drive turbine rotor drives the fan through the geared architecture, the first turbine shaft and the fan drive turbine shaft are concentric and rotatable about the engine longitudinal axis, and the fan drive turbine rotor is axially aft of the first turbine rotor relative to the engine longitudinal axis;

a first bearing assembly that rotatably supports the first turbine shaft;

an aft bearing assembly that rotatably supports the fan drive turbine shaft at a position axially aft of the first bearing assembly relative to the engine longitudinal axis;

wherein the fan drive turbine rotor includes a disk assembly that carries a plurality of rows of a plurality of turbine blades, the disk assembly is mechanically attached to the fan drive turbine shaft at an attachment point, the attachment point being axially aft of the aft bearing assembly such that an aft portion of the fan drive turbine shaft is cantilevered from the aft bearing assembly with respect to the engine longitudinal axis;

wherein the disk assembly comprises a metallic material, and each of the turbine blades comprises a ceramic matrix composite (CMC) material;

wherein no more than 60% of a total weight of the fan drive turbine rotor is defined by metallic materials;

wherein an aftmost row of the plurality of rows of the turbine blades is axially aft of the fan drive turbine shaft; and wherein an axial length is established between the aft bearing assembly and an aft end of the fan drive turbine shaft relative to the engine longitudinal axis, a radial distance is established between the engine longitudinal axis and a radially outermost portion of the turbine blades in the aftmost row relative to the engine longitudinal axis, and a ratio of the axial length divided by the radial distance is between 0.2 and 0.4.

9. The turbofan gas turbine engine as recited in claim 8, wherein the turbine section includes an array of blade outer air seals arranged about tips of the turbine blades to establish a clearance gap, wherein the clearance gap is less than or equal to 0.03 inches in response to a combined rate of change in pitch and yaw of the engine at 1 radians/second in operation.

10. The turbofan gas turbine engine as recited in claim 8, wherein the turbine section includes a mid-turbine frame between the first turbine and the fan drive turbine, the mid-turbine frame supports the first bearing assembly and the aft bearing assembly, the mid-turbine frame includes at least one vane extending across a gas path, and the turbine blades are rotatable in the gas path.

11. The turbofan gas turbine engine as recited in claim 10, wherein the aftmost row of the plurality of rows of the turbine blades establish an aftmost row of airfoils of the turbofan gas turbine engine.

12. The turbofan gas turbine engine as recited in claim 10, wherein a total number of the rows of the turbine blades includes at least three rows, but no more than six rows.

13. A turbofan gas turbine engine, comprising:

a fan section including a fan and a fan case surrounding the fan to define a bypass duct, the fan rotatable about an engine longitudinal axis;

a geared architecture;

a compressor section including a first compressor and a second compressor;

a combustor in fluid communication with the compressor section;

a turbine section in fluid communication with the combustor and including a first turbine and a fan drive turbine, wherein the first turbine includes a first turbine rotor, a first turbine shaft interconnects the first compressor and the first turbine rotor, the fan drive turbine includes a fan drive turbine rotor, a fan drive turbine shaft interconnects the geared architecture and the fan drive turbine rotor such that the fan drive turbine rotor drives the fan through the geared architecture, the first turbine shaft and the fan drive turbine shaft are concentric and rotatable about the engine longitudinal axis, and the fan drive turbine rotor is axially aft of the first turbine rotor relative to the engine longitudinal axis;

a first bearing assembly that rotatably supports the first turbine shaft;

an aft bearing assembly that rotatably supports the fan drive turbine shaft at a position axially aft of the first bearing assembly relative to the engine longitudinal axis;

wherein the fan drive turbine rotor includes a disk assembly that carries a plurality of rows of a plurality of turbine blades, the disk assembly is mechanically attached to the fan drive turbine shaft at an attachment point, the attachment point being axially aft of the aft bearing assembly such that an aft portion of the fan drive turbine shaft is cantilevered from the aft bearing assembly with respect to the engine longitudinal axis;

wherein the disk assembly comprises a metallic material, and each of the turbine blades comprises a ceramic matrix composite (CMC) material;

wherein the turbine section includes a mid-turbine frame between the first turbine and the fan drive turbine, the mid-turbine frame supports the first bearing assembly and the aft bearing assembly, the mid-turbine frame includes at least one vane extending across a gas path, and the turbine blades are rotatable in the gas path;

wherein an aftmost row of the plurality of rows of the turbine blades is axially aft of the fan drive turbine shaft;

wherein a total number of the rows of the turbine blades includes at least three rows, but no more than six rows; and wherein an axial length is established between the aft bearing assembly and an aft end of the fan drive turbine shaft relative to the engine longitudinal axis, a radial distance is established between the engine longitudinal axis and a radially outermost portion of the turbine blades in the aftmost row relative to the engine longitudinal axis, and a ratio of the axial length divided by the radial distance is between 0.2 and 0.4.

14. The turbofan gas turbine engine as recited in claim 13, wherein no more than 60% of a total weight of the fan drive turbine rotor is defined by metallic materials.

15. The turbofan gas turbine engine as recited in claim 14, wherein a total number of the rows of the turbine blades includes no more than four rows.

16. The turbofan gas turbine engine as recited in claim 14, wherein the turbine section includes an array of blade outer air seals arranged about tips of the turbine blades to establish a clearance gap, wherein the clearance gap is less than or equal to 0.03 inches in response to a combined rate of change in pitch and yaw of the engine at 1 radian/second in operation.

* * * * *